United States Patent
Christenson

(10) Patent No.: US 8,224,995 B2
(45) Date of Patent: *Jul. 17, 2012

(54) METHOD AND SYSTEM FOR PROVIDING AN ACCURATE ADDRESS OF A DEVICE ON A NETWORK

(75) Inventor: Steven L. Christenson, Campbell, CA (US)

(73) Assignee: Cisco Technology, Inc., San Jose, CA (US)

( * ) Notice: Subject to any disclaimer, the term of this patent is extended or adjusted under 35 U.S.C. 154(b) by 333 days.

This patent is subject to a terminal disclaimer.

(21) Appl. No.: 12/018,852

(22) Filed: Jan. 24, 2008

(65) Prior Publication Data

US 2008/0140848 A1   Jun. 12, 2008

Related U.S. Application Data

(63) Continuation of application No. 09/908,285, filed on Jul. 18, 2001, now Pat. No. 7,339,927.

(51) Int. Cl.
*G06F 15/16* (2006.01)

(52) U.S. Cl. ........ 709/245; 709/227; 709/228; 709/237; 370/389; 370/392

(58) Field of Classification Search ................ 709/245, 709/227–228, 237
See application file for complete search history.

(56) References Cited

U.S. PATENT DOCUMENTS

| | | | | |
|---|---|---|---|---|
| 5,559,801 A | * | 9/1996 | Lo | 370/412 |
| 6,061,349 A | | 5/2000 | Coile et al. | 370/389 |
| 6,353,614 B1 | | 3/2002 | Borella et al. | 370/389 |
| 6,446,112 B1 | | 9/2002 | Bunney et al. | 709/204 |
| 6,542,935 B1 | | 4/2003 | Ishii | 709/245 |
| 6,625,715 B1 | | 9/2003 | Mathews | 711/207 |
| 6,772,315 B1 | | 8/2004 | Perego | 711/207 |
| 6,798,767 B1 | | 9/2004 | Alexander et al. | 370/352 |
| 6,822,957 B1 | | 11/2004 | Schuster et al. | 370/389 |
| 6,826,176 B1 | | 11/2004 | Siddiqui et al. | 370/352 |
| 6,831,917 B1 | | 12/2004 | Cheriton | 370/392 |
| 2002/0101859 A1 | * | 8/2002 | Maclean | 370/352 |
| 2002/0186698 A1 | * | 12/2002 | Ceniza | 370/401 |
| 2005/0089050 A1 | * | 4/2005 | Cheriton | 370/397 |

\* cited by examiner

*Primary Examiner* — Mohamed Ibrahim
(74) *Attorney, Agent, or Firm* — Baker Botts L.L.P.

(57) ABSTRACT

A method, system and reporting arrangement for providing an accurate address of a device which receives media are described. In particular, these method, system and reporting arrangement enable a request to be received for establishing communication with the device. In addition, the accurate address (which is an actual address) of the device is determined using the method, system and reporting arrangement. Thereafter, the request is responded to using a response, which includes the accurate address of the device that can be transmitted to the device.

20 Claims, 3 Drawing Sheets

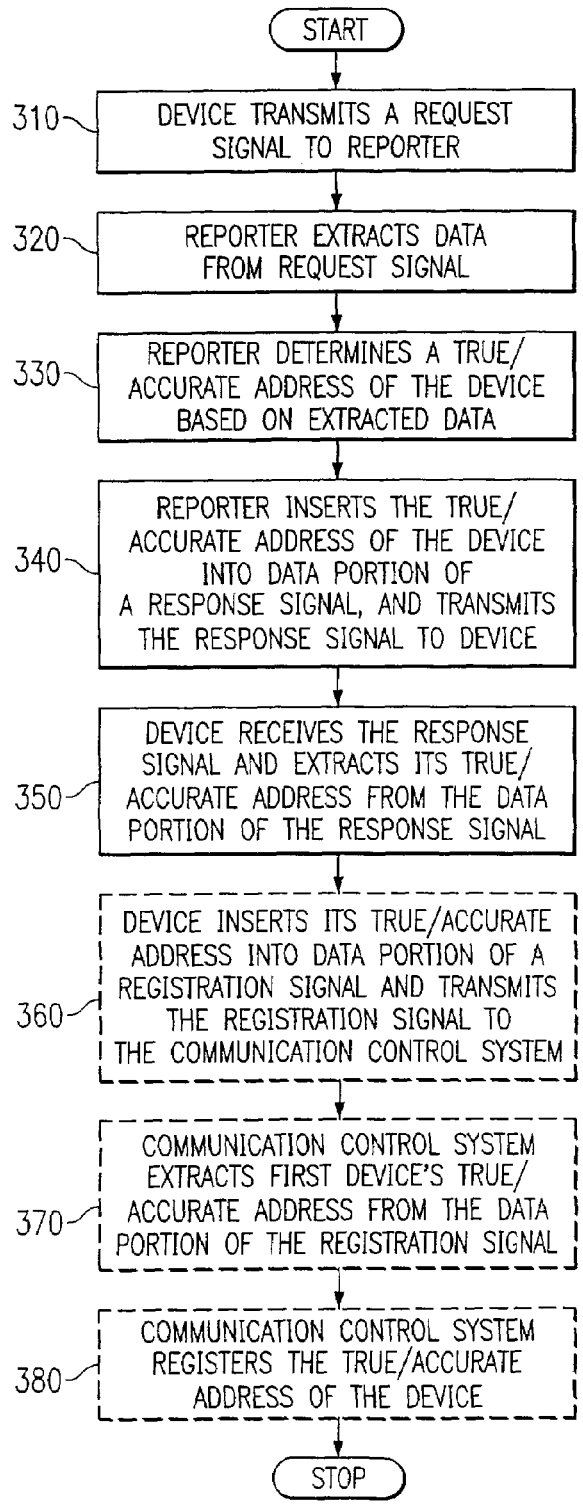
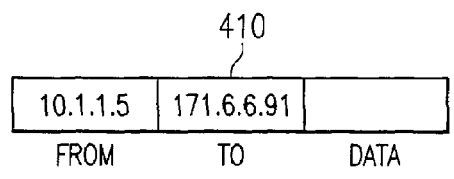
FIG. 5A
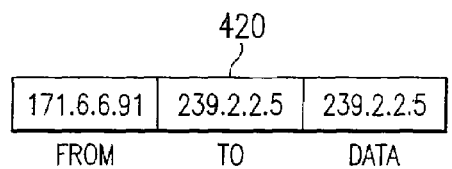
FIG. 5B
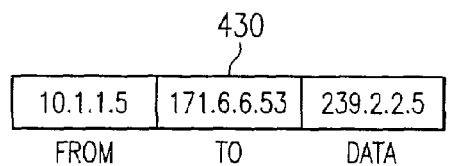
FIG. 5C
FIG. 4

METHOD AND SYSTEM FOR PROVIDING AN ACCURATE ADDRESS OF A DEVICE ON A NETWORK

CROSS-REFERENCE TO RELATED APPLICATION

This application is a continuation of U.S. application Ser. No. 09/908,285 filed Jul. 18, 2001 and entitled "Method and System for Providing an Accurate Address of a Device on a Network".

TECHNICAL FIELD OF THE INVENTION

The present invention relates in general to packet-based communication networks, and more particularly to a method and system for providing an accurate address of a device on a network for media streaming.

BACKGROUND OF THE INVENTION

To deliver high bandwidth low cost communications solutions, many organizations and individuals use packet-based communications systems. These systems may support various types of communications, including the communication of streaming data such as data, voice or video. Audio and/or video streaming media sessions may occur over packet-based networks which utilize, e.g., Voice over Internet Protocol ("VoIP"), various video streaming/conferencing protocols, etc., and may allow for the collaboration of video, audio and data on a network.

Conventional systems and methods frequently stream media which is transmitted using a Uniform Data Packet Internet Protocol ("UDP/IP"). While certain set-up messages may operate properly in such environment, one or more media streams may not reach the intended destination. This problematic scenario arises because, e.g., multiple Internet Protocol ("IP") addresses are assigned to a particular endpoint device receiving the media stream. In this situation, a control device managing the transmission and receipt of the media stream between given endpoint devices may often select the address information for the particular endpoint to which the media cannot be sent to, as opposed to the address to which the streaming media can be transmitted to.

The above-described inaccurate selection of the IP address destination for the particular endpoint device may occur because one or more of such endpoint devices may include two or more Network Interface Cards ("NICs") assigned thereto. In addition, a particular endpoint device may reside on a Virtual Private Network ("VPN") which assigns certain IP addresses to the devices connected thereto which are different from the originally-assigned IP addresses for these devices. If the VPN is not operating properly, the streaming media may not be able to reach the intended endpoint. Further, with the presence of a Network Address Translation ("NAT") device, the device forwarding the streaming media to the intended endpoint device may be required to reach the NAT device first so that the NAT device would perform the address translation before the media stream reaches its destination.

The above described situation may contribute to unforeseen difficulties in selecting an accurate (i.e., actual) destination address for media streams. Thus, because the media streams are generally transmitted using datagrams, no "sessions" are established to assist the devices transmitting/receiving the media stream in properly routing the associated steaming media packets. Therefore, problems may occur when the media is streamed in these situations.

SUMMARY OF THE INVENTION

In accordance with the teachings of the present invention, the disadvantages and problems associated with providing an accurate address of a device on a network have been substantially reduced or eliminated.

In an aspect of the present invention, a method, system and reporting arrangement are provided to facilitate an accurate address of a device which receives media. In particular, these method, system and reporting arrangement enable a request to be received for establishing communication with the device. In addition, the accurate address (which is an actual address) of the device is determined using the method, system and reporting arrangement. Thereafter, the request is responded to using a response, which includes the accurate address of the device that can be transmitted to the device.

In another embodiment, the request can be generated by the device. A request can be made to stream the media to the accurate address of the device. Also, the response can include an originator address portion, a target address portion and a data portion. The accurate address of the device may be provided in the data portion. Furthermore, the request can be transmitted by a data routing arrangement, which may be provided on the same network as the device. The device may also include a logical address, which can be translated into the accurate address. Then, the accurate address of the device can be associated with the request. The accurate address can be determined by extracting the accurate address from the request.

In yet another embodiment, the reporter arrangement can receive the request and provides the response, with the reporter arrangement being connected to a network which is remote from the device. The response can include the originator address portion, a target address portion and a data portion. The reporter arrangement may insert the accurate address into the data portion. The reporter arrangement is capable of transmitting the response. Also, the originator address portion may include an address of the reporter arrangement, and the target address portion may include the accurate address of the device.

In still another embodiment, the response can be received and assigned to the device. Then, a further request can be transmitted for receiving the media, the further request including an originator address which has the accurate address of the device therein. It is possible to transmit the further request to a communication request server for streaming the media between the device and a media arrangement. The reporter arrangement can be provided on a same subnet as the communication request server. According to one implementation, the media arrangement streams the media to the accurate address of the device, and the communication request server may include the reporter arrangement. Also, the further request may be transmitted in a vertical private network environment, a multi-network interface card environment and/or a network address translation environment. In another implementation, the further request can be provided independently from an underlying communication mechanism. Also, the accurate address may be determined by analyzing the request.

In another embodiment, an actual internet protocol ("IP") address of a first device can be determined to enable the first device to receive streaming media from a second device. In particular, a reporting arrangement can receive a request from the first device to establish communication with the second device. For this request, the actual IP address of the first device can be determined, the actual IP address being associated with the request. Then, the actual IP address of the first device may be stored in a data portion of a message, the message including an originator address portion and a target address portion. Furthermore, the message is transmitted to the first device so that the first device can provide the actual IP address to the second device for communicating with the second device in a connectionless environment.

In a further embodiment, the accurate address of a device which receives media can be established. In particular, a message which includes the accurate address of the device in a data portion of the message can be received. Then, the accurate address of the device can be extracted. Thereafter, the accurate address of the device can be established as an actual address of the device when the media is provided to the device.

Other technical advantages will be readily apparent to one skilled in the art from the following figures, descriptions, and claims.

BRIEF DESCRIPTION OF THE DRAWINGS

For a more complete understanding of the present invention and its advantages, reference is now made to the following description, taken in conjunction with the accompanying drawings, in which:

FIG. 4 is a flow diagram illustrating an exemplary embodiment of a method for providing an accurate address of the endpoint device on a network which can be performed by the reporter device shown in FIG. 3, and for registering such endpoint device with the communication control system shown in FIGS. 1 and 3;

FIG. 5A is an exemplary request signal generated by the endpoint device illustrated in FIG. 3, using the exemplary method of FIG. 4;

FIG. 5B is an exemplary response signal generated by the reporter device illustrated in FIG. 2, using the exemplary method of FIG. 4; and FIG. 5C is an exemplary registration signal generated by the endpoint device to be received by the communication control system illustrated in FIG. 3, using the exemplary method of FIG. 4.

DETAILED DESCRIPTION OF THE INVENTION

Figure 1:
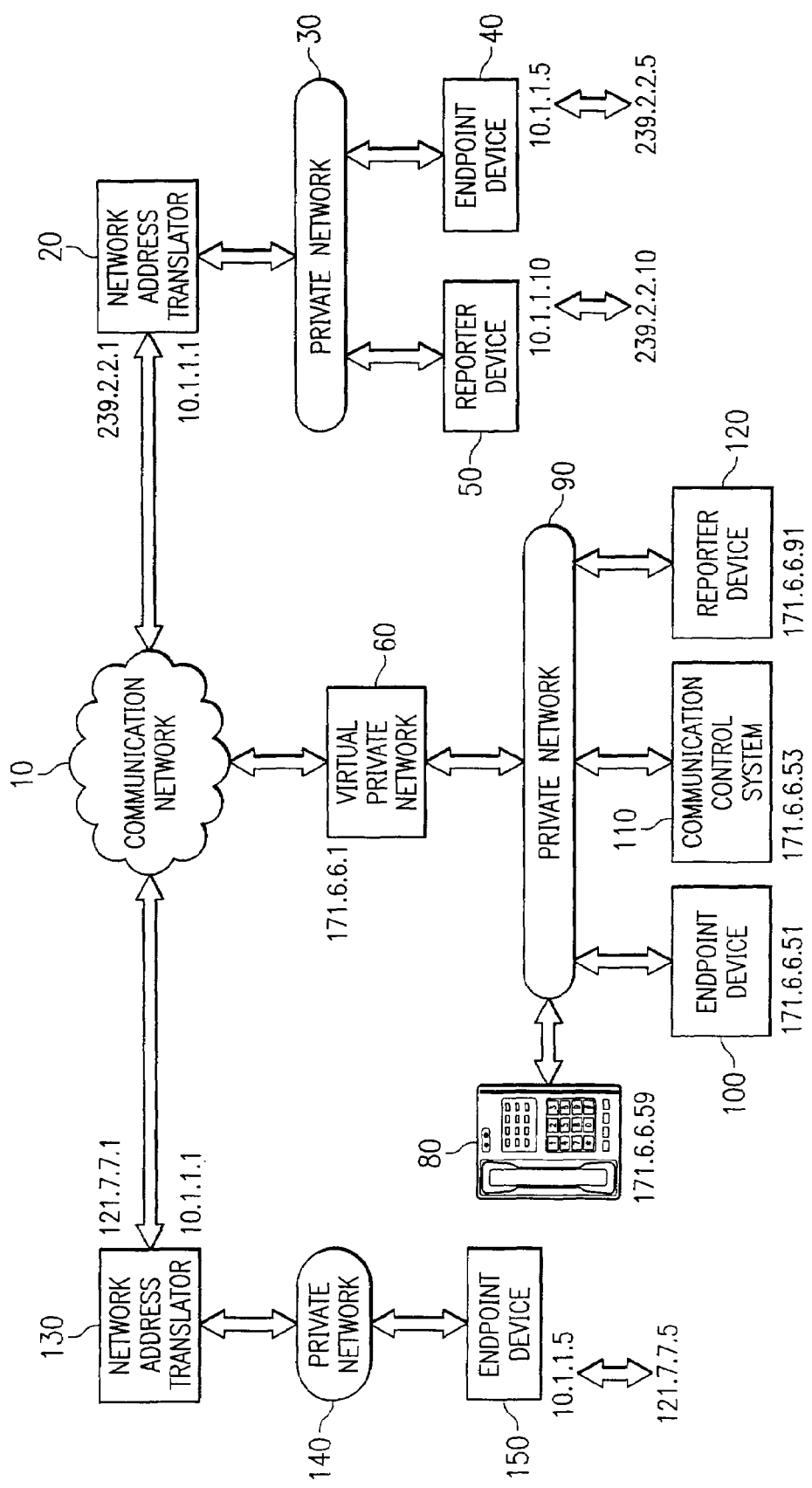
FIG. 1 is an exemplary embodiment of a communication network to which endpoint devices, reporter devices and communication control systems can be connected according to the present invention.

FIG. 1 illustrates an exemplary embodiment of a communication network 10 to which two network address translators ("NATs") 20, 130 are connected. The network address translators 20, 130 can be gateways between respective private networks 30, 140 and the communication network 10. The communication network 10 can also be connected to a virtual private network arrangement 60, which may also manage its own respective private network 90. The communication network 10 and the private networks 30, 90 and 140 are capable of facilitating the transmission and receipt of media streams, such as video streams, audio streams, data streams, etc. These media streams can be converted into a suitable analog or digital form to allow the systems and devices provided on the communication network 10 to communicate with the devices that may not necessarily be connected to this communication network 10.

The exemplary private networks 30, 90, 140 may generally have various devices connected thereto. In the exemplary embodiment illustrated in FIG. 1, the private network 30 associated with the NAT 20 has an endpoint device 40 and a reporter device 50 connected thereto. The private network 140 connects an endpoint device 150 to the communication network 10. The endpoint devices 40, 80, 100, 150 shall be referred to hereinafter as "endpoints". The private network 90 connects endpoints 80, 100, a communication control system 110 and another reporter device 120 to the communication network 10. The exemplary operation of the devices and systems connected to the communication network 10 and the communication there between are described in further detail below.

The communication network 10 may be a local area network (LAN), wide area network (WAN), global distributed network such as the Internet, intranet, extranet, or any other form of wireless or wired communication network. Generally, the communication network 10 facilitates the transmission and reception of packets, cells, frames, or other portion of information (generally referred to as packets) as media streams to communicate between the endpoints 40, 80, 100, 150, and between other devices and systems internal to and external from the communication network 10 and the endpoints 40, 80, 100, 150. The communication network 10 may include any combination of routers, hubs, switches, servers, printers, workstations, minicomputers and other hardware and/or software that would allow for the exchange of the packets and the media streaming in the network 10. Each of the private networks 30, 90, 140 can be the intranet, extranet, or any other form of wireless or wired communication network, and may also have any combination of routers, hubs, switches, servers, printers, workstations, minicomputers and other hardware and/or software for allowing transmission and reception of the streaming media thereon.

In the exemplary embodiment of the present invention, the communication network 10 utilizes communication protocols which provide for the addressing and/or identification of the NATs 20, 130, the endpoints 40, 80, 100, 150, the reporter devices 50, 120, the communication control 110, central processors and other devices coupled to the communication network 10. For example, by using the UDP/IP, each of the components coupled together by the communication network 10 may be identified using IP addresses. In this manner, the communication network 10 may support any form and combination of point-to-point, multicast, unicast, or other techniques for exchanging the media packets and streaming media between the components provided on the communication network 10. The communication network 10 may also be a network which utilizes protocols other than the Internet Protocol.

Figure 2:
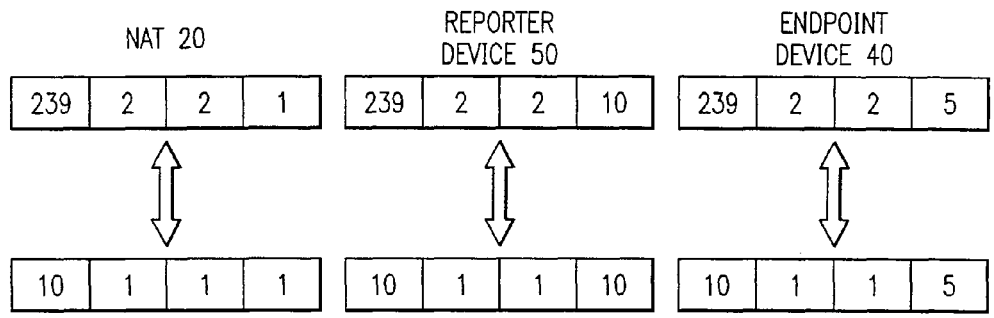
FIG. 2 is an exemplary diagram of address conversion of certain devices performed by a particular Network Address Translator ("NAT") connected to the communication network of FIG. 1.

The NATs 20, 130 can be provided to convert accurate IP addresses of the devices in their respective private networks 30, 140 to virtual IP addresses. The accurate IP address can be defined as a true or actual IP address of a particular device which can be directly accessed by devices which are not connected to a respective network of the private networks 30, 140. FIG. 2 shows an exemplary address conversion of the respective IP addresses of the NAT 20, the reporter 50 and the endpoint 40 provided on the private network 30. For example, the NAT 20 can convert its accurate IP address of "239.2.2.1" to a virtual corresponding address of "10.1.1.1" and back to the respective accurate IP address. In addition, the NAT 20 may convert the IP address of the reporter device 50 from its accurate IP address of "239.2.2.10" to a corresponding virtual IP address of "10.1.1.10" and back to the respective accurate IP address. A substantially similar address conversion can be performed for the endpoint 40, i.e., the accurate IP address of the endpoint 50 (e.g., "239.2.2.5") can be converted to a corresponding virtual IP address (i.e., "10.1.1.5"). In this manner, the NAT 20 can utilize an unlimited number of the virtual IP addresses, and thus eliminate the restriction of utilizing only the accurate IP addresses assigned to the entity which manages the respective private network. However, as described above, such conversion of the IP addresses may prevent the devices connected to the private network 30 to receive the streaming media from the devices outside of such private network 30, and not connected thereto. This may be because the devices that are external to the private network 30 are only availed the virtual IP address of the device connected to the private network 30 with which they are communicating, and not the accurate IP address of such device. Thus, the media stream would most likely not be directly routed to the device requesting the media stream which resides on the private network 30.

The above-described NAT-assisted addressing scheme facilitates communication which can be considered "connectionless" communication, e.g., no sessions between the devices residing on the network take place. The exemplary system and method of the present invention can also operate in other "connectionless" communication scenarios. For example, the media can be streamed in multiple network interface card ("NIC"), virtual private network and other similar environments. The details of the exemplary system and method are provided below.

The endpoints 40, 80, 100, 150 can be any combination of hardware and/or software which are capable of transmitting and/or receiving any type of a media stream (e.g., data, voice and video streams) via the communication network 10. For example, the endpoint 80 may be an IP telephone (as shown in FIG. 1), and each of the endpoints 40, 100, 150 may be a media stream transceiver device. Each of the endpoints 40, 80, 100, 150 can also be a computer executing a telephone-related software, a video monitor, a camera, or any other communication or processing hardware and/or software that supports the receipt, transmission and/or display of the media streams using the communication network 10. Although FIG. 1 illustrates that the private network 30 has one endpoint 40, that the private network 90 has two endpoints 80, 100 and that the private network 140 has one endpoint 150, any number of the endpoints can be connected to the respective private networks 40, 90, 140 for transceiving the media streams. The communication control system 110 is provided on the private network 90 to manage the communication between the endpoints 40, 80, 100 and 150 and other devices provided on the communications network 10. The exemplary communication control system 110 can be, e.g., a call control system such as a Gateway, Gatekeeper, Cisco CallManager, etc. For example, the communication control system 110 facilitates the establishment of the media streaming between given endpoints when it is requested to do so.

Each of the exemplary reporter devices 50, 120 can be a general purpose computing device (e.g., an Intel-based handheld personal computer, laptop computer, desktop computer, minicomputer, etc.) or a special purpose computer. One example of at least one of the reporter devices 50, 120 can be an HTTP Server. According to one exemplary embodiment, at least one of the reporter devices 50, 120 receives request signals from the endpoints 40, 80, 100, 150 which include the accurate IP addresses of the respective endpoints. Upon the receipt of these request signals, one or more of the reporter devices 50, 120 extract the accurate IP address of the respective endpoint which previously transmitted the request signal, insert the accurate IP address of such endpoint into a data field of a response signal, and transmit the response signal to the accurate IP address of the endpoint which transmitted the request signal. The benefits of such identification, extraction and transmission of the accurate IP address of the respective endpoint shall be described in further detail below.

Figure 3:
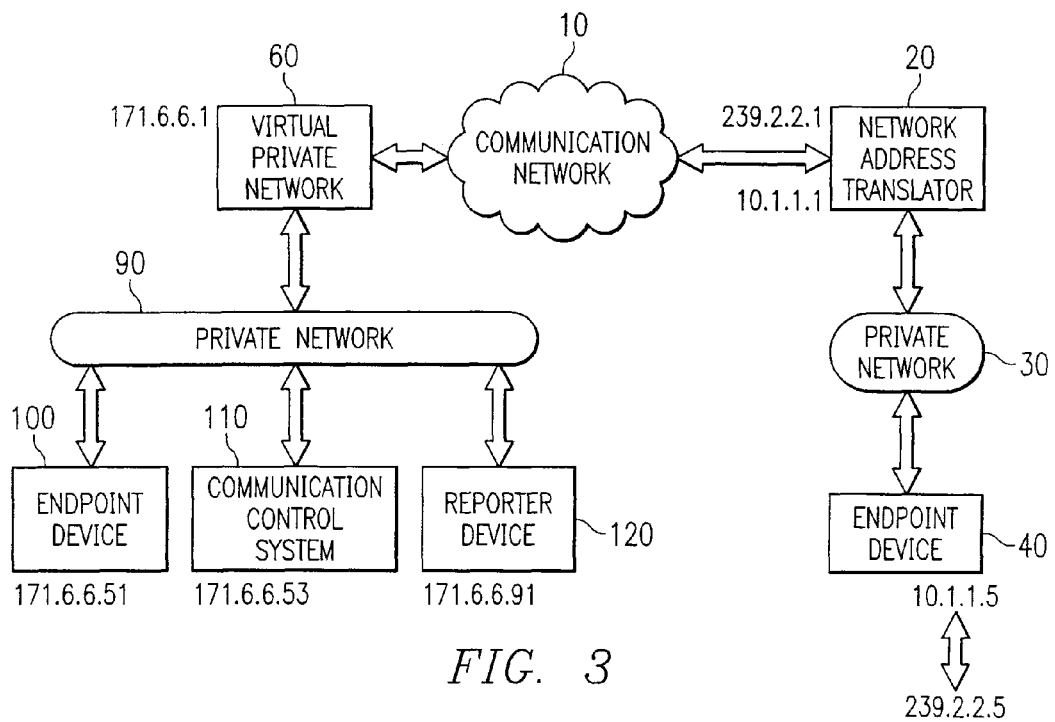
FIG. 3 is a detailed exemplary diagram of an arrangement in which a reporter device connected to the communication network shown in FIG. 1 is adapted for establishing an accurate address of one or more endpoint devices.

FIG. 3 illustrates a detailed exemplary diagram of the communication network 10 shown in FIG. 1 in which the reporter device 120 (which is connected to the private network 90) is utilized for establishing the accurate IP address of the endpoint 40 (which is connected to another private network 30). In an exemplary embodiment illustrated in FIG. 3, the reporter device 120 and the communication control system 110 are connected on the same private network 90, and possibly on the same subnet. It should be understood that the reporter device 120 can be provided in and connected at other location, subnets and/or private networks. For example, it is possible to place separate reporter devices on the private network 30 and on the private network 90, as shown in FIG. 1. Each of the devices connected to the private network 90 may be assigned their respective accurate IP address for communicating with each other and other devices which are not connected to the private network 90, as follow:

| DEVICE | IP ADDRESS |
|---|---|
| virtual private network arrangement 60 | 171.6.6.1 |
| endpoint 100 | 171.6.6.51 |
| communication control system 110 | 171.6.6.53 |
| reporter device 120 | 171.6.6.91 |

It is also possible that the devices connected to the private network 90 can be assigned virtual IP addresses if not accurate IP addresses.

FIG. 4 illustrates a flow diagram of an exemplary embodiment of a method for providing an accurate address of a device on a network which can be performed by the reporter device 120. To describe the exemplary embodiment of these method and system, communication of the endpoint 40 (connected to the private network 30) with the reporter device 120 and the communication control system 110 (connected to the private network 90) will be referred to herein below. However, it should be understood that the system and method of present invention are in no way limited to any such communication. Indeed, they can be used for communicating between one or more endpoints, one or more communication control systems, and/or one or more reporter device, as well as communicating between the combination of each.

In step 310, the exemplary method of FIG. 4 provides that the device (e.g., the endpoint 40) transmits a request signal to a reporter (e.g., the reporter device 120). The exemplary request signal 410 can be a simple "GET" request, and as illustrated in FIG. 5A, may include a "FROM" field, a "TO" field and a "DATA" field. In the present exemplary embodiment illustrated in FIG. 5A, the "TO" field has a virtual IP address of "10.1.1.5" assigned to the endpoint 40 by the NAT 20. The "TO" field has an accurate IP address of the reporter device 120—"171.6.6.91". At this stage of the exemplary method, the "DATA" field of the request signal 410 is empty.

Then, in step 320, the reporter device 120 receives the request signal, and extracts particular data from the request signal. In step 330, the reporter device 120 determines the accurate IP address of the endpoint 40 (i.e., "239.2.2.5") which generated this request signal based on the extracted data. The determination of the accurate IP address of the endpoint 40, e.g., the endpoint generating the request signal, can be performed by retrieving the remote address of this endpoint 40 from a header of the request signal. In particular, the NAT 20 provides the accurate address of the endpoint 40 in this header, which is then extracted as described above.

Thereafter, in step 340, the reporter device 120 transmits a response signal to the endpoint 40. As shown in FIG. 5B and similar to the request signal 410 of FIG. 5A, this response signal 420 includes the "FROM", "TO", and "DATA" fields. Prior to the transmission of the response signal to the endpoint 40, the reporter device 120 inserts the accurate IP address of the endpoint 40 (e.g., "239.2.2.5"), as determined in step 330, into the "DATA" field of the response signal 420. The "FROM" field of the response signal 420 has the accurate IP address of the reporter device 120 (e.g., "171.6.6.91"), and the "TO" field of the response signal has the accurate IP address of the endpoint 40 (e.g., "239.2.2.5"). Thereafter, the reporter device 120 transmits the response signal 420 directly to the endpoint 40's accurate IP address (e.g., "239.2.2.5") using the information provided in the "TO" field of the response signal 420. The return packet preferably passes through the NAT 20 which converts the accurate IP address of the endpoint 40 (e.g., "239.2.2.5") to the endpoint 40's virtual IP address (e.g., "10.1.1.5"). In step 350, the endpoint 40 receives the response signal 420, extracts its accurate IP address provided in the "DATA" field of the response signal 420 and possibly stores it.

At this stage, the endpoint 40 can utilize this extracted accurate IP address to effectively receive media streams from other devices on the communication network 10 which are not directly connected to the private network 30. This media stream reception can be effectively performed because the endpoint 40 may provide its accurate IP address to the devices from which it prefers to receive the media streams. These devices may utilize the accurate IP address of the endpoint 40 to stream the media to the accurate IP address of the endpoint 40 via the NAT 20, thereby allowing the NAT 20 to properly route the requests.

As shown in FIG. 4, the endpoint 40 can also register with the communication control system 110 so that this system would be aware of the endpoint 40's accurate IP address for any future media streaming communication that is effectuated by the communication control system 110. For example, in step 360, the endpoint 40 can transmit a registration signal to the communication control system 110 for the registration purposes. The exemplary registration signal 430 is illustrated in FIG. 5C, and has a structure that is substantially similar to the structure of the request signal 410 of FIG. 5A and the response signal 420 of FIG. 5B. In particular, this registration signal 430 includes the "FROM", "TO", and "DATA" fields. Prior to the transmission of the registration signal 430 by the endpoint 40 to the communication control system 110, the endpoint 40 inserts its accurate IP address that is extracted from the "DATA" field of the response signal 420 (e.g., "239.2.2.5") into the "DATA" field of the registration signal 430. The "FROM" field of the registration signal 420 has the virtual IP address of the endpoint 40 (e.g., "10.1.1.5"), and the "TO" field of the response signal has the accurate IP address of the communication control system 110 (e.g., "171.6.6.53"). Thereafter, the endpoint 40 transmits the registration signal 430.

In step 370, the communication control system 110 receives the registration signal 430, and extracts the accurate IP address of the endpoint 40 provided in the "DATA" field of the registration signal 430. Finally, in step 380, the communication control system 110 registers the endpoint 40 as having the accurate IP address of "239.2.2.5". As discussed above, when the endpoint 40 requests the streaming media via the communication control system 110, such streaming media can be transmitted directly to the accurate IP address of the endpoint 40 due to the registration of this endpoint 40 with the communication control system 110. In a similar manner, the endpoint 40 can transmit its accurate IP address to another endpoint, e.g., the endpoint 100 when requesting the streaming media therefrom. This endpoint 100 would also extract the accurate IP address of the endpoint 40 from the "DATA" field of the signal it receives from the endpoint, and utilize this accurate IP address to transmit the streaming media directly to the endpoint 40, i.e., without having this IP address information being modified.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for providing an accurate address of a device which receives media, comprising:
   receiving a request signal to establish communication with the device, the request signal comprising an origination field with a virtual address of the device;
   extracting data from the request signal;
   determining the accurate address of the device from the extracted data, the accurate address being an actual address of the device; and
   responding to the request signal with a response signal which includes the accurate address in a data portion of the response signal, the data portion separate from a header portion of the response signal.

2. The method of claim 1, wherein a reporter arrangement receives the request signal and provides the response signal, the reporter arrangement connected to a network which is remote from the device.

3. The method of claim 2, wherein the reporter arrangement transmits the response.

4. The method of claim 3, wherein the response signal includes an origination field with an address of the reporter arrangement.

5. The method of claim 3, wherein the response signal includes a target field with the accurate address of the device.

6. The method of claim 1, wherein the request signal is generated by the device.

7. The method of claim 6, further comprising requesting the media to be streamed to the accurate address of the device.

8. The method of claim 1, wherein the request signal is transmitted by a data routing arrangement.

9. The method of claim 8, wherein the data routing arrangement is provided on the same network as the device.

10. The method of claim 1, further comprising:
    translating the virtual address of the device into the accurate address; and
    associating the accurate address of the device with the request signal.

11. A reporter system for establishing an accurate address of a device to receive media, the reporter system comprising a processor configured to:

receive a request signal to establish communication with the device, the request signal comprising an origination field with a virtual address of the device, extract data from the request signal, determine the accurate address of the device from the extracted data, the accurate address being an actual address of the device, and respond to the request signal by transmitting a response signal which includes the accurate address of the device in a data portion of the response signal, the data portion separate from a header portion of the response signal.

12. The reporter system of claim 11, wherein the processor is configured to receive the request signal and provide the response signal, the system provided on a network which is remote from the device.

13. The reporter system of claim 12, wherein the processor is configured to transmit the response signal.

14. The reporter system of claim 12, wherein the response signal includes an origination field with an address of the reporter arrangement.

15. The reporter arrangement of claim 14, wherein the response signal includes a target field with the accurate address of the device.

16. A method for selecting an actual internet protocol (IP) address of a first device to enable the first device to receive streaming media from a second device, comprising:

receiving, by a reporting arrangement, a request signal from the first device to establish communication with the second device;

determining, from the request signal, the actual IP address of the first device, the actual IP address being associated with the request signal;

storing the actual IP address of the first device in a data portion of a message, the message including an originator address portion and a target address portion, the data portion separate from a header portion of the response signal; and transmitting the message to the first device so that the first device can provide the actual IP address to the second device for communicating with the second device in a connectionless environment.

17. The method of claim 16, wherein the connectionless environment utilizes a uniform data packet protocol.

18. The method of claim 16, wherein the connectionless environment includes a virtual private network environment.

19. The method of claim 16, wherein the connectionless environment facilitates communication with multi-network network card devices.

20. Logic embodied in a non-transitory computer readable medium, the computer readable medium comprising code operable to:

receive a request signal to establish communication with a device, the request signal comprising an origination field with a virtual address of the device;

extract data from the request signal;

determine an accurate address of the device from the extracted data, the accurate address being an actual address of the device; and respond to the request signal with a response signal which includes the accurate address in a data portion of the response signal, the data portion separate from a header portion of the response signal.

* * * * *